United States Patent
Chauvel

(10) Patent No.: US 7,587,583 B2
(45) Date of Patent: Sep. 8, 2009

(54) METHOD AND SYSTEM FOR PROCESSING A "WIDE" OPCODE WHEN IT IS NOT USED AS A PREFIX FOR AN IMMEDIATELY FOLLOWING OPCODE

(75) Inventor: Gerard Chauvel, Antibes (FR)

(73) Assignee: Texas Instruments Incorporated, Dallas, TX (US)

( * ) Notice: Subject to any disclaimer, the term of this patent is extended or adjusted under 35 U.S.C. 154(b) by 467 days.

(21) Appl. No.: 11/188,503

(22) Filed: Jul. 25, 2005

(65) Prior Publication Data

US 2006/0026402 A1    Feb. 2, 2006

(30) Foreign Application Priority Data

Jul. 27, 2004   (EP) .................... 04291918

(51) Int. Cl.
*G06F 9/00* (2006.01)
(52) U.S. Cl. ..................... 712/226
(58) Field of Classification Search ................ 712/208, 712/210, 226, 229
See application file for complete search history.

(56) References Cited

U.S. PATENT DOCUMENTS

| | | | |
|---|---|---|---|
| 5,781,750 A | | 7/1998 | Blomgren et al. |
| 5,796,973 A | * | 8/1998 | Witt et al. ............. 712/208 |
| 5,892,966 A | | 4/1999 | Petrick et al. |
| 5,898,850 A | * | 4/1999 | Dickol et al. ............ 712/229 |
| 6,205,540 B1 | | 3/2001 | Grieb et al. |
| 6,253,314 B1 | * | 6/2001 | Itoh ............. 712/226 |
| 6,480,952 B2 | | 11/2002 | Gorishek et al. |
| 6,957,322 B1 | * | 10/2005 | Pickett ............. 712/211 |
| 6,965,984 B2 | * | 11/2005 | Seal et al. ............. 712/209 |
| 2004/0024999 A1 | | 2/2004 | Chauvel et al. |
| 2004/0268090 A1 | * | 12/2004 | Coke et al. ............. 712/209 |

OTHER PUBLICATIONS

Intel 80386 Programmer's Reference, Chapter 16.2, 1986, available at http://web.archive.org/web/19990224165911/ http://www.online.ee/~andre/i80386/chap16.html.
The JavaTM Virtual Machine Specification, Sun Microsystems, Inc., 1999, available at http://java.sun.com/docs/books/jvms/second_edition/html/Instructions2.doc15.html.

* cited by examiner

*Primary Examiner*—David J Huisman
(74) *Attorney, Agent, or Firm*—Lawrence J. Bassuk; W. James Brady; Frederick J. Telecky, Jr.

(57) ABSTRACT

Methods and systems are provided for the selective use of a Java WIDE opcode as a prefix as defined in the instruction set of the Java virtual machine or performing a task assigned to the Java WIDE opcode. A Java WIDE opcode is fetched, a determination is made as to whether the Java WIDE opcode is to be used as a prefix, and when the Java WIDE opcode is not to be used as a prefix, a task assigned to the Java WIDE opcode is performed.

9 Claims, 3 Drawing Sheets

| R0 | GENERAL PURPOSE (GP) | |
|---|---|---|
| R1 | GENERAL PURPOSE (GP) | |
| R2 | GENERAL PURPOSE (GP) | |
| R3 | GENERAL PURPOSE (GP) | |
| R4 | PROGRAM COUNTER (PC) | |
| R5 | GENERAL PURPOSE/LOCAL VARIABLE POINTER (LV) | |
| R6 | STACK POINTER (SP) | |
| R7 | TOP OF STACK (ToS) | |
| R8 | GENERAL PURPOSE/ADDRESS INDEX 0 (AI0) | |
| R9 | GENERAL PURPOSE/ADDRESS INDEX 1 (AI1) | |
| R10 | GENERAL PURPOSE (GP) | |
| R11 | GENERAL PURPOSE (GP) | |
| R12 | MICRO-PROGRAM COUNTER (micro-PC) | |
| R13 | GENERAL PURPOSE (GP) | |
| R14 | GENERAL PURPOSE/INDIRECT REGISTER INDEX (IRI) | |
| R15 | STATUS AND CONTROL (ST) | WIDE ENABLE FLAG ~198 |

*FIG. 3*

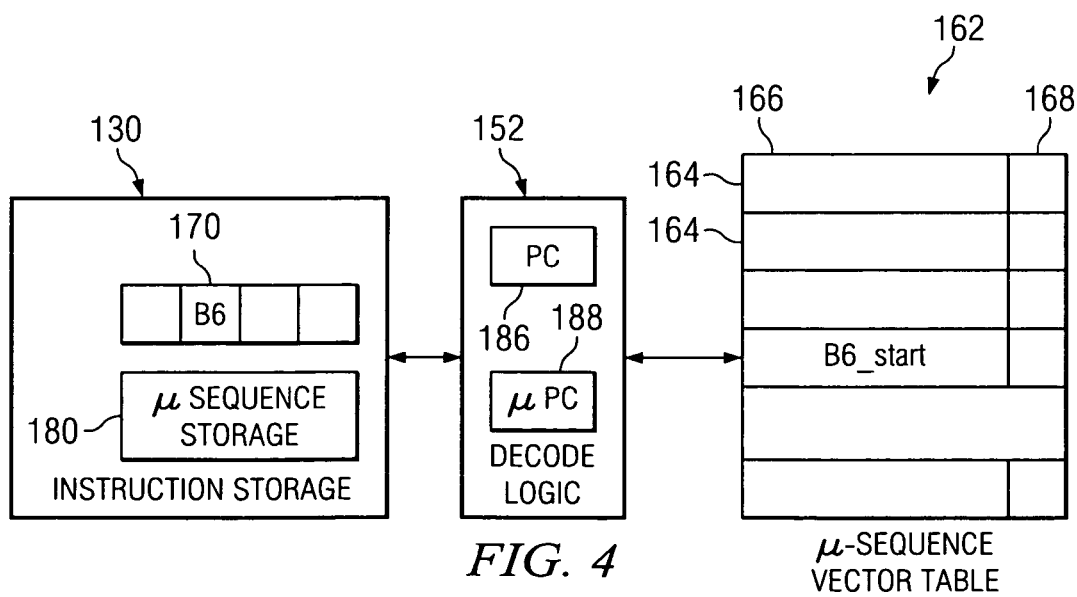

*FIG. 4*

METHOD AND SYSTEM FOR PROCESSING A "WIDE" OPCODE WHEN IT IS NOT USED AS A PREFIX FOR AN IMMEDIATELY FOLLOWING OPCODE

CROSS-REFERENCE TO RELATED APPLICATIONS

This application claims the benefit of European Patent Application No. 04291918.3, filed Jul. 27, 2004, incorporated by reference herein as if reproduced in full below. This application is related to co-pending and commonly assigned application Ser. No. 11/188,336 entitled "Method and System to Disable the 'WIDE' prefix Prefix."

BACKGROUND OF THE INVENTION

1. Technical Field of the Invention

The present invention relates to processors and more particularly to processors that execute Java™ bytecodes.

2. Background Information

Java™ is a programming language that, at the source code level, is similar to object oriented programming languages such as C++. Java™ language source code is compiled into an intermediate representation based on a plurality of "bytecodes" that define specific tasks. In some implementations, the bytecodes are further compiled to machine language for a particular processor. Some processors, however, are designed to execute some of the Java™ bytecodes directly.

An "opcode" is a single member of the group bytecodes, and one such opcode is known as "WIDE," having a value 0xC4 (hexadecimal value C4). In particular, when an opcode is immediately preceded by a WIDE opcode, the operand width is greater than if the WIDE opcode is not present. For example, a directly executed Java™ opcode "ILOAD" (integer load), when not preceded by WIDE, may fetch a 32 bit word into the local variable at the location indicated by an eight bit operand. When ILOAD is immediately preceded by a WIDE opcode, the ILOAD opcode may fetch a 32 bit word into the local variable at the location indicated by a sixteen bit operand. Thus, WIDE extends the number of available local variables to 65,536, though each local variable is 32 bits in width regardless of the presence or absence of a WIDE. When decoding and executing opcodes, the processor decodes the WIDE but does not execute a "WIDE" function; rather, the processor adjusts the operand width of a subsequent opcode based on the presence of the WIDE.

Opcodes are each 8 bits in width, limiting the set of bytecodes to 256 possible opcodes. Thus, the WIDE opcode utilized as a prefix limits by one the functions that can be assigned specific opcodes.

SUMMARY

The problems noted above are solved in large part by a method and related system of using a "WIDE" opcode as other than a prefix. At least some of the illustrative embodiments may be a method comprising fetching an opcode (the opcode used in at least some circumstances as a prefix to other opcodes), and determining whether the opcode is used as a prefix. If the opcode is not used as the prefix, then the method further comprises executing the opcode; or replacing the opcode by a group of other instructions.

NOTATION AND NOMENCLATURE

Certain terms are used throughout the following description and claims to refer to particular system components. As one skilled in the art will appreciate, semiconductor companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ". Also, the term "couple" or "couples" is intended to mean either an indirect or direct connection. Thus, if a first device couples to a second device, that connection may be through a direct connection, or through an indirect connection via other devices and connections.

The terms "asserted" and "not asserted" are used herein to refer to Boolean conditions. An asserted state need not necessarily be a logical 1 or a high voltage state, and thus could equally apply to an asserted being a logical 0 or a low voltage state. Thus, in some embodiments an asserted state may be a logical 1 and a not-asserted state may be a logical 0, with de-assertion changing the state from a logical 1 to a logical 0. Equivalently, an asserted state may be a logic 0 and a not-asserted state may a logical 1 with a de-assertion being a change from a logical 0 to a logical 1.

BRIEF DESCRIPTION OF THE DRAWINGS

For a more detailed description of the preferred embodiments of the present invention, reference will now be made to the accompanying drawings, wherein:

FIG. 3 shows various registers used in the JSM of FIGS. 1 and 2;

FIG. 4 illustrates operation of the JSM to trigger "microsequences";

DETAILED DESCRIPTION OF THE PREFERRED EMBODIMENTS

The following discussion is directed to various embodiments of the invention. Although one or more of these embodiments may be preferred, the embodiments disclosed should not be interpreted, or otherwise used, as limiting the scope of the disclosure, unless otherwise specified. In addition, one skilled in the art will understand that the following description has broad application, and the discussion of any embodiments is meant only to be exemplary of those embodiments, and not intended to intimate that the scope of the disclosure, is limited to those embodiments.

The subject matter disclosed herein is directed to a programmable electronic device such as a processor. The processor described herein is particularly suited for executing Java™ bytecodes, or comparable code. Java™ itself is particularly suited for embedded applications as it is a relatively "dense" language, meaning that on average each instruction may perform a large number of functions compared to other programming languages. The dense nature of Java™ is of particular benefit for portable, battery-operated devices with small amounts of memory. The reason, however, for executing Java™ code is not material to this disclosure or the claims which follow. Further, the processor advantageously has one or more features that permit the execution of the Java™ code to be accelerated.

Figure 1:
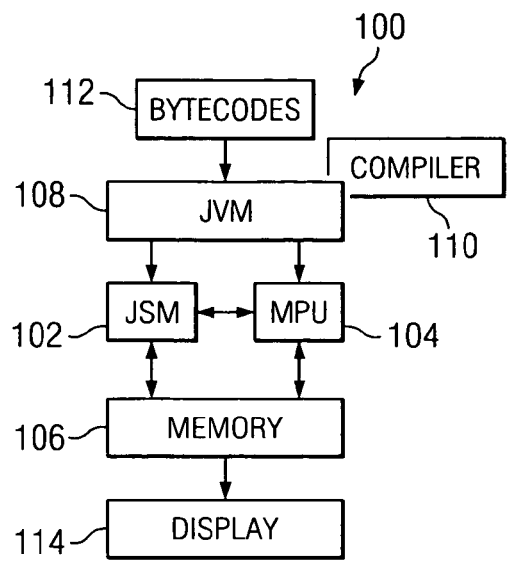
FIG. 1 shows a diagram of a system in accordance with embodiments of the invention.

FIG. 1 shows a system 100 in accordance with embodiments of the invention. As shown, the system may comprise at least two processors 102 and 104. Processor 102 may be referred to for purposes of this disclosure as a Java Stack Machine ("JSM") and processor 104 may be referred to as a Main Processor Unit ("MPU"). System 100 may also comprise memory 106 coupled to both the JSM 102 and MPU 104. At least a portion of the memory 106 may be shared by both processors, and if desired, other portions of the memory 106 may be designated as private to one processor or the other. System 100 also comprises a Java Virtual Machine ("JVM") 108, compiler 110, and a display 114. The JVM 108 may comprise a combination of software and hardware. The software may comprise the compiler 110 and the hardware may comprise the JSM 102. The JVM may comprise a class loader, bytecode verifier, garbage collector, and a bytecode interpreter loop to interpret the bytecodes that are not executed on the JSM processor 102. Other components (not specifically shown) may be included as desired for various applications.

Java™ language source code is converted or compiled to a series of bytecodes 112, with each individual one of the bytecodes referred to as an "opcode." Bytecodes 112 may be provided to the JVM 108, possibly compiled by compiler 110, and provided to the JSM 102 and/or MPU 104 for execution. In accordance with some embodiments of the invention, the JSM 102 may execute at least some Java™ bytecodes directly. When appropriate, however, the JVM 108 may also request the MPU 104 to execute one or more Java™ bytecodes not executed or executable by the JSM 102. In addition to executing compiled Java™ bytecodes, the MPU 104 also may execute non-Java instructions. The MPU 104 may thus also host an operating system ("O/S") (not specifically shown) which performs various functions such as system memory management, system task management that schedules the software aspects of the JVM 108 and most or all other native tasks running on the system, management of the display 114, and receiving input from input devices (not specifically shown). Java™ code, whether executed on the JSM 102 or MPU 104, may be used to perform any one of a variety of applications such as multimedia, games or web based applications in the system 100, while non-Java™ code, which may comprise the O/S and other native applications, may still run on the system on the MPU 104.

Most Java™ bytecodes perform stack-based operations. For example, an "IADD" (integer add) Java™ opcode pops two integers off the top of the stack, adds them together, and pushes the sum back on the stack. A "simple" opcode is one in which the JSM 102 may perform an immediate operation either in a single cycle (e.g., an IADD opcode) or in several cycles (e.g., "DUP2_X2"). A "complex" opcode is one in which several memory accesses may be required to be made within the JVM data structure for various verifications (e.g., NULL pointer, array boundaries).

A JSM processor 102 in accordance with embodiments of the invention may execute, in addition to the Java™ bytecodes, a second instruction set other than Java™ bytecodes. In some embodiments, the second instruction set may comprise register-based and memory-based operations rather than stack-based operations. This second instruction set complements the Java™ instruction set and, accordingly, may be referred to as a complementary instruction set architecture ("C-ISA"). By complementary, it is meant that some complex Java™ bytecodes may be replaced by a "micro-sequence" comprising C-ISA instructions. The execution of Java™ code may thus be made more efficient and run faster by replacing some opcodes by more efficient micro-sequences of C-ISA instructions. As such, JSM 102 comprises a stack-based architecture for efficient and accelerated execution of Java™ bytecodes, combined with a register-based architecture for executing register and memory based micro-sequences of C-ISA instructions. Because various data structures described herein are JVM-dependent, and thus may change from one JVM implementation to another, the software flexibility of the micro-sequence provides a mechanism for various JVM optimizations now known or later developed.

Figure 2:
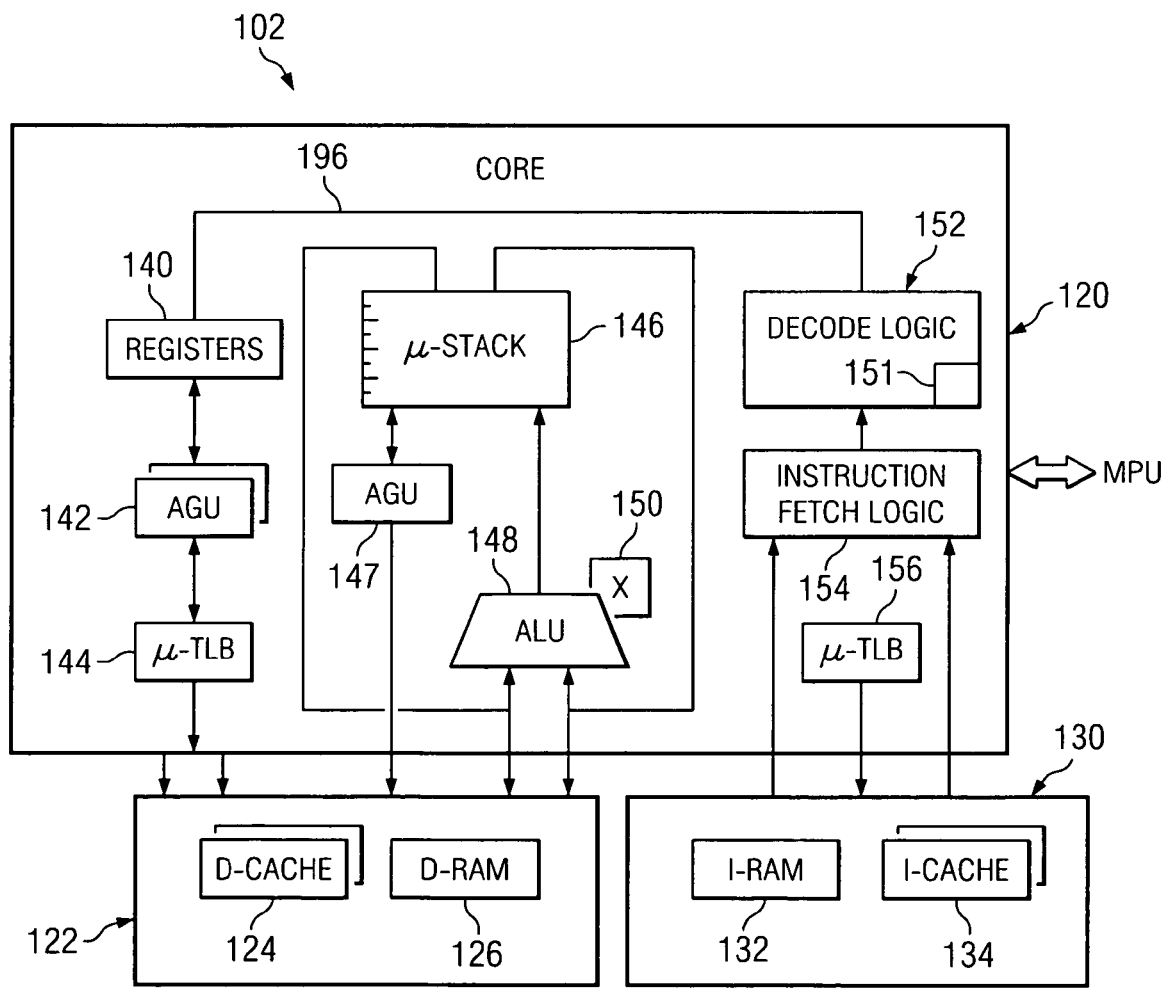
FIG. 2 shows a block diagram of the JSM of FIG. 1 in accordance with embodiments of the invention.

FIG. 2 shows an illustrative block diagram of the JSM 102. As shown, the JSM comprises a core 120 coupled to data storage 122 and instruction storage 130. The components of the core 120 preferably comprise a plurality of registers 140, address generation units ("AGUs") 142 and 147, micro-translation lookaside buffers (micro-TLBs) 144 and 156, a multi-entry micro-stack 146, an arithmetic logic unit ("ALU") 148, a multiplier 150, decode logic 152, and instruction fetch logic 154. Data pointed to by operands of opcodes may be retrieved from data storage 122 or from the micro-stack 146, and processed by the ALU 148. Instructions may be fetched from instruction storage 130 by fetch logic 154 and decoded by decode logic 152. The AGUs 142 may be used to calculate addresses for micro-sequence instructions based, at least in part, on data contained in the registers 140. AGU 147 couples to the micro-stack 146 and may manage overflow and underflow conditions in the micro-stack 146. The micro-TLBs 144 and 156 perform the function of a cache for the address translation and memory protection information bits that are under the control of the operating system running.

Java™ bytecodes may pop data from and push data onto the micro-stack 146, which preferably comprises a plurality of gates in the core 120 of the JSM 102. The micro-stack 146 preferably comprises the top n entries of a larger stack that is implemented in data storage 122. Although the value of n may be vary in different embodiments, in accordance with at least some embodiments the size n of the micro-stack may be the top eight entries in the larger, memory-based stack. By implementing the micro-stack 146 hardware in the core 120 of the processor 102, access to the data contained in the micro-stack 146 is very fast, although any particular access speed is not a limitation on this disclosure.

ALU 148 adds, subtracts, and shifts data. The multiplier 150 may be used to multiply two values together in one or more cycles. The instruction fetch logic 154 fetches instructions from instruction storage 130, which instructions may be decoded by decode logic 152. Because the JSM 102 is configured to process instructions from at least two instruction sets, the decode logic 152 comprises at least two modes of operation, one mode for each instruction set. As such, the decode logic unit 152 may comprise a Java™ mode in which Java™ bytecodes may be decoded, and a C-ISA mode in which micro-sequences of C-ISA instructions may be decoded.

The data storage 122 comprises data cache ("D-cache") 124 and data random access memory ("D-RAM") 126. The stack (excluding the micro-stack 146), arrays and non-critical data may be stored in the D-cache 124, while Java™ local variables, critical data and non-Java™ variables (e.g., C, C++) may be stored in D-RAM 126. The instruction storage 130 may comprise instruction RAM ("I-RAM") 132 and instruction cache ("I-CACHE") 134. The I-RAM 132 may be used for opcodes or micro-sequences, and the I-CACHE 134 may be used to store other types of Java™ bytecode and mixed Java™/C-ISA instructions.

Referring now to FIG. 3, the registers 140 may comprise a plurality of registers designated as R0-R15. Registers R0-R3, R5, R8-R11 and R13-R14 may be used as general purposes ("GP") registers for any purpose. Other registers, and some of the GP registers, may be used for specific purposes. For example, registers R4 and R12 may each be used to store program counters, with R4 storing a program counter ("PC") for a stream of bytecodes, and R12 storing a micro-program counter ("micro-PC") for an executing micro-sequence. The use of the PC and micro-PC will be explained in greater detail below. In addition to use as a GP register, register R5 may be used to store the base address of a portion of memory in which Java™ local variables may be stored when used by the current Java™ method. The top of the micro-stack 146 can be referenced by the values in registers R6 and R7, and the top of the micro-stack may have a matching address in external memory pointed to by register R6. The values contained in the micro-stack are the latest updated values, while their corresponding values in external memory may or may not be up to date. Register R7 provides the data value stored at the top of the micro-stack. Registers R8 and R9 may also be used to hold the address index 0 ("AI0") and address index 1 ("AI1"). Register R14 may also be used to hold the indirect register index ("IR1"). Register R15 may be used for status and control of the JSM 102. At least one bit (called the "Micro-Sequence-Active" bit, not specifically shown) in status register R15 is used to indicate whether the JSM 102 is executing by way of a micro-sequence. This bit controls in particular, which program counter is used R4 (PC) or R12 (micro-PC) to fetch the next instruction. Another bit of the status and control register R15 (the bit termed herein the "WIDE ENABLE flag" or "WIDE ENABLE bit", and given the reference number 198) is used to indicate whether the Java™ WIDE opcode is treated as a prefix, or whether the WIDE value 0xC4 (hexadecimal value C4) may be assigned other functions directly executable by the processor or executable by way of a micro-sequence. In alternative embodiments, the WIDE ENABLE flag may be in other portions of the JSM processor 102, such as a register 151 in the decode logic 152 (FIG. 2).

Referring again to FIG. 2, and in accordance with embodiments of the invention, the WIDE ENABLE flag 198 of illustrative register R15 (not specifically shown in FIG. 2) preferably couples to the decode logic 152 by way of line 196. When the WIDE ENABLE flag 198 is asserted, the decode logic 152, and indeed the processor 102, treat WIDE as a prefix that modifies the operand width of an opcode that immediately follows the WIDE opcode. However, when the WIDE ENABLE flag 198 is not asserted, then the WIDE opcode (0xC4) is treated like other opcodes that may be directly executable by the processor 102. Thus, when the WIDE ENABLE flag 198 is not asserted the 0xC4 opcode can perform any desired functionality, and that functionality need not necessarily be related to operand width. Moreover, the 0xC4 opcode may then also be utilized as a trigger for execution of a micro-sequence.

FIG. 4 illustrates the operation of the JSM 102 with regard to triggering of micro-sequences based on Java™ bytecodes, including the 0xC4 opcode when the WIDE ENABLE flag 198 is not asserted. In particular, FIG. 4 illustrates the instruction storage 130, the decode logic 152, and a micro-sequence vector table 162. The decode logic 152 accesses the instruction storage 130 and a micro-sequence vector table 162. The decode logic 152 retrieves instructions (e.g., instruction 170) from instruction storage 130 by way of instruction fetch logic 154 (FIG. 2) and decodes the instructions to determine the type of instruction. If the instruction 170 is a WIDE opcode, and the WIDE ENABLE flag 198 is asserted, the decode logic instructs the processor with regard to fetch width regarding the next opcode, and the process starts anew. If, however, the WIDE ENABLE flag 198 is not asserted and the 0xC4 opcode is the fetched opcode, the JSM 102 either directly executes the opcode to perform any desirable function, or triggers a micro-sequence to perform any desirable function.

The micro-sequence vector table 162 may be implemented in the decode logic 152, or as separate logic in the JSM 102. The micro-sequence vector table 162 preferably comprises a plurality of entries 164, such as one entry for each opcode that the JSM may receive. For example, if there are a total of 256 bytecodes, the micro-sequence vector table 162 preferably comprises at least 256 entries. Each entry 164 may have at least two fields—a field 166 and an associated field 168. The associated field 168 may comprise a single bit that indicates whether the instruction 170 is to be directly executed, or whether the field 166 contains a reference to a micro-sequence. For example, an asserted bit 168 may indicate the corresponding opcode is directly executable by the JSM, and a non-asserted bit 168 may indicate that the field 166 contains a reference to a micro-sequence.

If the bit 168 indicates the field 166 includes a reference to a micro-sequence, the reference may comprise the full starting address in instruction storage 130 of the micro-sequence, or a part of the starting address that can be concatenated with a base address that may be programmable in the JSM. In the former case, field 166 may provide as many address bits as are required to access the full memory space. In the latter case, a register within the JSM registers 140, or preferably within a JSM configuration register accessible through an indirect addressing mechanism using the IRI register, is programmed to hold the base address. In these embodiments the vector table 162 may supply only the offset to access the start of the micro-sequence. Most or all JSM internal registers 140 and any other registers may be accessible by the MPU 104, and therefore may be modified by the JVM as necessary. Although not required, the offset addressing technique may be preferred to reduce the number of bits needed within field 166. At least a portion 180 of the instruction storage 130 may be allocated for storage of micro-sequences and thus the starting address may point to a location in micro-sequence storage 180 at which a particular micro-sequence can be found. The portion 180 may be implemented in I-RAM 132 shown in FIG. 2.

In operation, the decode logic 152 uses an opcode, including the 0xC4 opcode when the WIDE ENABLE flag 198 is not asserted, as an index into micro-sequence vector table 162. Once the decode logic 152 locates the indexed entry 164, the decode logic 152 examines the associated bit 168 to determine whether the opcode triggers a micro-sequence. If the bit 168 indicates that the opcode can be directly processed and executed by the JSM, then the instruction is so executed. If, however, the bit 168 indicates that the opcode triggers a micro-sequence, then the decode logic 152 preferably changes the opcode into a "NOP," executes the NOP opcode, asserts the micro-sequence-active bit in the status register R15 (not specifically shown), and begins fetching the first micro-sequence instruction. Changing the opcode into a NOP while fetching the first instruction of the micro-sequence permits the JSM to process multi-cycle instructions that are further advanced in the pipe without additional latency. The micro-sequence-active bit may be set at any suitable time, such as when the micro-sequence enters the JSM execution stage (not specifically shown).

The JSM 102 implements two program counters—the PC 186 (register R4) and the micro-PC 188 (register R12). In accordance with some embodiments, one of these two program counters is the active program counter used to fetch and decode instructions. The PC 186 stored in register R4 may be the active program counter when executing bytecodes. The micro-PC 188 stored in register R12 may be the active program counter when fetching and executing micro-sequences. Setting the status register's micro-sequence-active bit causes the micro-PC 188 (register R12) to become the active program counter instead of the PC 186. Also, the contents of the field 166 associated with the micro-sequenced opcode is loaded into the micro-PC 188. At this point, the JSM 102 begins fetching and decoding the instructions of the micro-sequence. At or about the time the decode logic begins using the micro-PC 188 from register R12, the PC 186 preferably is incremented by a suitable value to point the program counter to the next instruction following the opcode that triggered the micro-sequence. In at least some embodiments, the micro-sequence-active bit within the status register R15 may only be changed when the first instruction of the micro-sequence enters the execute phase of JSM 102 pipe. The switch from PC 186 to the micro-PC 188 preferably is effective immediately after the micro-sequenced instruction is decoded, thereby reducing the latency.

The micro-sequence, including the micro-sequence pointed to based on the 0xC4 opcode, may perform any suitable task and then end with a predetermined instruction from the C-ISA called "RtuS" (return from micro-sequence) that indicates the end of the sequence. This C-ISA instruction causes a switch from the micro-PC (register R12) to the PC (register R4). Preferably, the PC 186 was previously incremented so that the value of the PC 186 points to the next instruction to be decoded.

Figure 5:
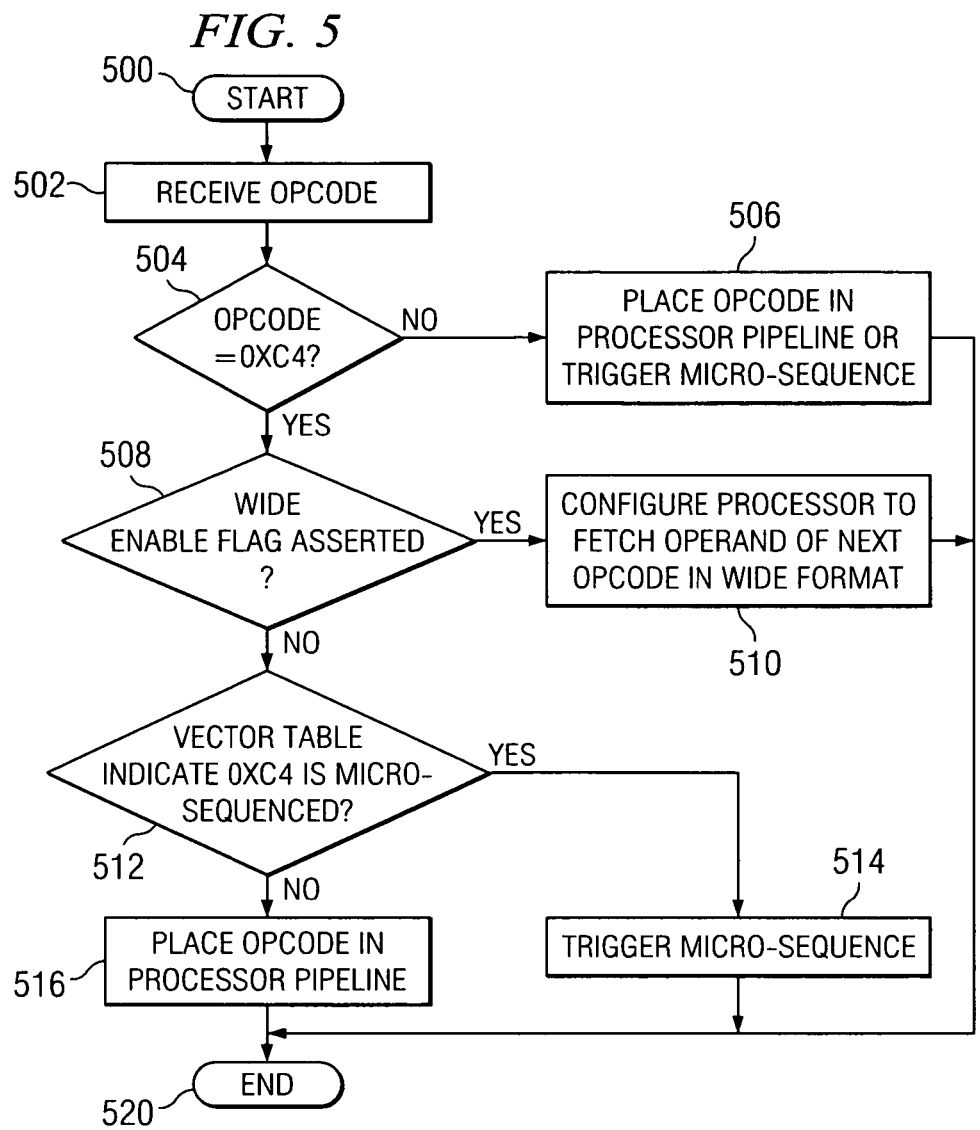
FIG. 5 illustrates a method in accordance with embodiments of the invention.

FIG. 5 illustrates a flow diagram of a method in accordance with embodiments of the invention. In particular, FIG. 5 illustrates a method that may be implemented, at least in part, by the decode logic 152. The process may start (block 500) and thereafter receive an opcode (block 502) by the decode logic 152. The decode logic determines if the opcode value is 0xC4 (block 504). If the received opcode does not have a value of 0xC4, the opcode is either placed in the processor's pipeline or the decode logic triggers a micro-sequence (block 506) as previously discussed. If, however, the opcode does have a value of 0xC4 (block 504), then the decode logic 152 determines whether the WIDE ENABLE flag is asserted (block 508). Assertion or de-assertion of the WIDE ENABLE flag 198 may take place by opcodes that precede the current opcode and/or may take place by software executing on the MPU 104. If the WIDE ENABLE flag is asserted (block 508) then the decode logic 152 configures the processor 102 to fetch operand of the next opcode in WIDE format (block 510), and the process ends (block 520). Thus, in the case where the WIDE ENABLE flag 198 is asserted, the decode logic uses the 0xC4 WIDE opcode as a prefix rather than an opcode that is directly executable or that triggers execution of a micro-sequence.

Still referring to FIG. 5, if the WIDE ENABLE flag is not asserted (block 508), the decode logic 152 make a determination as to whether the vector table at offset 0xC4 indicates use of a micro-sequence (block 512). If the opcode indicates triggering of a micro-sequence, the decode logic 152 then triggers the micro-sequence (block 514). If, on the other hand, the vector table does not indicate that the 0xC4 opcode triggers a micro-sequence, the decode logic 152 places the 0xC4 opcode in the processor pipeline (block 516). The 0xC4 opcode may perform any suitable task. Similarly, a micro-sequence triggered by the 0xC4 opcode may perform any suitable task. After placing the opcode in the processor pipeline (block 516) or triggering a micro-sequence based on the opcode (block 514), the illustrative method ends (block 520). Though the illustrative method may end, preferably the method is immediately restarted upon receipt of the next opcode.

Figure 6:
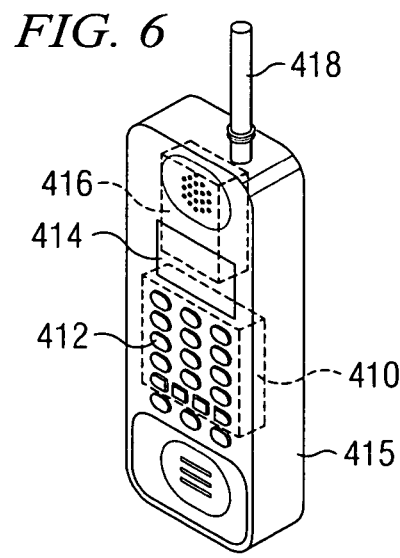
FIG. 6 depicts an illustrative embodiment of the system described herein.

System 100 may be implemented as a mobile cell phone such as that shown in FIG. 6. As shown, the mobile communication device includes an integrated keypad 412 and display 414. The JSM processor 102 and MPU processor 104 and other components may be included in electronics package 410 connected to the keypad 412, display 414, and radio frequency ("RF") circuitry 416. The RF circuitry 416 may be connected to an antenna 418.

While the various embodiments of the invention have been shown and described, modifications thereof can be made by one skilled in the art without departing from the spirit and teachings of the invention. The embodiments described herein are illustrative only, and are not intended to be limiting. Many variations and modifications of the invention disclosed herein are possible and are within the scope of the invention. For example, and depending on the implementation, an operand may have a width of 8 bits in the absence of a WIDE prefix, and may have a width of 16 bits if the WIDE prefix is present. An operand of 8 bits allows to fetch or select on of the 256 local variable 32 bit data, and an operand of 16 bits permit to address larger number local variables (65536). Each and every claim is incorporated into the specification as an embodiment of the present invention.

What is claimed is:

1. A method of operating a system including a stack machine and a processor that uses a stream of bytecodes for operation, the method comprising:
   A. fetching a WIDE opcode from the stream of bytecodes;
   B. determining whether the WIDE opcode is to be used as a prefix for an opcode that immediately follows the WIDE opcode in the stream of bytecodes; and
   C. when the WIDE opcode is not to be used as a prefix, performing a task assigned to the WIDE opcode, the performing a task including:
      i. using the WIDE opcode as an index into a vector table to locate an entry corresponding to the WIDE opcode;
      ii. when a bit in the entry is asserted, initiating direct execution of the WIDE opcode; and
      iii. when the bit in the entry is not asserted, triggering a micro-sequence referenced in the entry.

2. The method as defined in claim 1, wherein performing a task further comprises:
   determining whether the WIDE opcode is directly executable or triggers a micro-sequence; and
   when the WIDE opcode is directly executable, placing the WIDE opcode in a processor pipeline.

3. The method as defined in claim 2, further comprising:
   when the WIDE opcode triggers the micro-sequence referenced in the entry,
      changing the WIDE opcode to a NOP opcode,
      executing the NOP opcode,
      asserting a micro-sequence active bit, and
      fetching a first instruction of the micro-sequence referenced in the entry.

4. The method as defined in claim 1, wherein determining whether the WIDE opcode is to be used as a prefix further comprises determining whether a flag in a register of the stack machine is asserted.

5. A processor comprising:
A. fetch logic configured to retrieve a WIDE opcode from a stream of bytecodes stored in a memory;
B. decode logic coupled to the fetch logic, wherein the decode logic is configured to:
   i. determine, when the WIDE opcode is retrieved, whether the WIDE opcode is to be used as a prefix for an opcode that immediately follows the WIDE opcode in the stream of bytecodes; and
   ii. when the WIDE opcode is not to be used as a prefix, cause performance of a task assigned to the WIDE opcode; and
C. a vector table accessible by the decode logic, the vector table including an entry corresponding to the WIDE opcode, the decode logic configured to cause performance of a task assigned to the WIDE opcode by:
   i. using the WIDE opcode as an index into the vector table to locate the entry,
   ii. initiating direct execution of the WIDE opcode when a bit in the entry is asserted, and
   iii. triggering a micro-sequence referenced in the entry when the bit in the entry is not asserted.

6. The processor as defined in claim 5, wherein the decode logic is further configured to cause performance of a task assigned to the WIDE opcode by:
   determining whether the WIDE opcode is directly executable or triggers a micro-sequence;
   placing the WIDE opcode in a processor pipeline when the WIDE opcode is directly executable; and
   placing a NOP opcode in the processor pipeline instead of the WIDE opcode when the WIDE opcode triggers the micro-sequence referenced in the entry.

7. A system comprising:
A. a first processor;
B. a memory coupled to the first processor, the memory configured to store a stream of bytecodes;
C. a second processor coupled to the first processor and the memory, the second processor including:
   i. fetch logic configured to retrieve a WIDE opcode from the stream of bytecodes stored in the memory;
   ii. decode logic coupled to the fetch logic, wherein the decode logic is configured to:
      a. determine, when the WIDE opcode is retrieved, whether the WIDE opcode is to be used as a prefix for an opcode that immediately follows the WIDE opcode in the stream of bytecodes; and
      b. when the WIDE opcode is not to be used as a prefix, cause performance of a task assigned to the WIDE opcode;
   iii. a vector table coupled to and accessible by the decode logic, the vector table including an entry corresponding to the WIDE opcode; and
   iv. wherein the decode logic is further configured to cause performance of a task assigned to the WIDE opcode by:
      a. using the WIDE opcode as an index into the vector table to locate the entry,
      b. initiating direct execution of the WIDE opcode when a bit in the entry is asserted, and
      c. triggering a micro-sequence referenced in the entry when the bit in the entry is not asserted.

8. The system as defined in claim 7, wherein the decode logic is further configured to:
   determine whether the WIDE opcode is directly executable or triggers a micro-sequence.

9. The processor as defined in claim 8, wherein the decode logic is further configured to cause performance of a task assigned to the WIDE opcode by:
   placing the WIDE opcode in a processor pipeline when the WIDE opcode is directly executable; and
   placing a NOP opcode in the processor pipeline instead of the WIDE opcode when the WIDE opcode triggers the micro-sequence referenced in the entry.

* * * * *

UNITED STATES PATENT AND TRADEMARK OFFICE
CERTIFICATE OF CORRECTION

PATENT NO. : 7,587,583 B2 Page 1 of 1
APPLICATION NO. : 11/188503
DATED : September 8, 2009
INVENTOR(S) : Gerard Chauvel It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 549 days.

Signed and Sealed this

Twenty-first Day of September, 2010

David J. Kappos
*Director of the United States Patent and Trademark Office*